United States Patent [19]

Belart

[11] 4,267,904
[45] May 19, 1981

[54] SPOT-TYPE DISC BRAKE

[75] Inventor: Juan Belart, Walldorf, Fed. Rep. of Germany

[73] Assignee: ITT Industries, Inc., New York, N.Y.

[21] Appl. No.: 21,746

[22] Filed: Mar. 19, 1979

[30] Foreign Application Priority Data

Apr. 17, 1978 [DE] Fed. Rep. of Germany ....... 2816559

[51] Int. Cl.³ ............................................. F16D 65/02
[52] U.S. Cl. .................................. 188/73.3; 188/73.6
[58] Field of Search .................. 188/73.3, 73.5, 73.6, 188/73.4; 308/72

[56] References Cited

U.S. PATENT DOCUMENTS 3,917,033  11/1975  Rath et al. .......................... 188/73.3
4,034,858  7/1977   Rath ................................... 188/73.3

FOREIGN PATENT DOCUMENTS 2708317  9/1977  Fed. Rep. of Germany ..... 188/73.3
2298038  9/1976  France .............................. 188/73.3

Primary Examiner—Douglas C. Butler
Attorney, Agent, or Firm—John T. O'Halloran; Alfred C. Hill

[57] ABSTRACT

A floating-caliper spot-type disc brake for automotive vehicles comprising a support member having two arms extending over the edge of the brake disc, each arm having a longitudinal bore for receiving a guiding pin, a caliper member disposed between the two arms embracing the disc and two brake shoes each adjacent a different side of the disc, and two guide pins connected to the caliper member and slidably received in the bores for holding the caliper member in its operating position relative to the disc, each of the two guide pins having a spherical sliding surface engaging the cylindrical inner surface of an associated one of the bores to ensure self-alignment of the caliper member.

27 Claims, 4 Drawing Figures

SPOT-TYPE DISC BRAKE

BACKGROUND OF THE INVENTION

This invention relates to a spot-type disc brake for automotive vehicles including a brake support member straddling the edge of a brake disc having a central opening in which brake shoes arranged on either side of the brake disc are guided and held, and a brake caliper which embraces the brake shoes from outside carrying a brake-actuating device on only one side of the brake disc. The brake caliper is connected with the brake support member through a sliding guide arrangement including a retaining pin aligned parallel to the axis of rotation of the brake disc and slidably received in a bore, and a resilient arrangement clamping the brake caliper relative to the brake support member.

In a known spot-type disc brake of this type, such as disclosed in German printed patent application DE-OS No. 2,538,565, the brake caliper is rigidly connected with a cylindrical retaining pin sliding practically without clearance in a cylindrical bore disposed in that portion of the brake support member that straddles the brake disc. Though this arrangement results in an accurate and smooth guidance of the brake caliper on the brake support member, it has the disadvantage that deformations of the brake support member under the action of the frictional forces bearing thereupon during braking are transferred to the brake caliper, so that the latter assumes an inclined position resulting in the brake shoes being forced against the brake disc unevenly. After a prolonged period of operation this will cause an uneven wear of the brake shoes requiring premature replacement.

SUMMARY OF THE INVENTION

It is an object of the present invention to provide a sliding guide arrangement for a brake caliper of a spot-type disc brake of the type referred to hereinabove, which avoids the shortcomings of the known arrangement and ensures self-alignment of the brake shoes in their guiding arrangement.

A feature of the present invention is the provision of a spot-type disc brake comprising: a brake support member straddling a brake disc having a central opening in which a pair of brake shoes are disposed, each of the pair of brake shoes being disposed on a different side of the disc and being guided on guide surfaces present in the support member; a brake caliper disposed in the central opening embracing the disc and the pair of brake shoes from the outside, the caliper carrying a brake-actuating device on one side of the disc in direct actuating relationship with one of the pair of brake shoes; and a sliding guide arrangement to connect the caliper to the support member including a first closed end bore in one of the caliper and the support member, a first retaining pin parallel to the axis of rotation of the disc fastened to the other of the caliper and the support member and slidably received in the first bore, the first retaining pin having a spherical sliding surface in engagement with an associated first portion of a cylindrical inner surface of the first bore, a resilient arrangement to clamp the caliper to the support member, and two spaced bearing surfaces on one of the support member and the pair of brake shoes to support the caliper.

This guide arrangement provides a smooth guidance for the brake caliper permitting its alignment relative to the brake shoes independent of the degree of deformation of the brake support member. In no operating state are the brake shoes prevented by the brake caliper from aligning themselves parallel to the brake disc and frictionally engaging the brake disc with an even force when the brake is applied.

In an advantageous embodiment of this invention, the retaining pin includes a second sliding surface spaced from the spherical sliding surface with the clearance provided between the second sliding surface and its associated bore inner surface being greater than that between the spherical sliding surface and its associated bore inner surface. This second sliding surface is so arranged that with the brake in operation, it does not impair the necessary alignment of the brake caliper relative to the brake shoes. In assembly of the brake and during brake-shoe replacement, however, this second sliding surface serves the purpose of providing a sufficient guiding for the brake caliper on the brake support member through the retaining pin, thus simplifying handling of the brake. In this embodiment of the invention, another advantage is that if the spherical sliding surface is disposed approximately in the middle of the retaining pin and the second sliding surface is disposed at the pin's end lying in the bore there results a favorable location of the spherical sliding surface.

The necessary clearance at the second sliding surface may be obtained advantageously by providing the second sliding surface with a smaller diameter than the spherical sliding surface. The diameter of the second sliding surface may also be chosen such that, to obtain the desired clearance, the bore receiving the retaining pin has a stepped inner surface. This arrangement reduces advantageously the weakening of the brake support member by the bore receiving the retaining pin.

In a preferred embodiment, the end of the retaining pin extending out of the bore and bolted to the brake caliper or the brake support member carries an external thread whose core diameter is greater than the diameter of the sliding surfaces. This arrangement enables the retaining pin to be mounted through the fastening opening in the brake caliper or the brake support member, which is particularly advantageous in cases where the brake support member is integrally formed with a member of the wheel suspension of the vehicle, for example, the steering knuckle.

To protect the sliding surfaces against dirt and humidity, the retaining pin includes a necked-down or reduced diameter portion between the external thread and the spherical sliding surface, in which a sealing element, preferably a laminated seal, is arranged which is in sealed abutment with the bore's inner surface.

In another preferred embodiment of this invention, the brake caliper is in positive engagement with the brake support member through a securing member at a place remote from the retaining pin, such that the relative movement between brake caliper and brake support member, which is necessary for alignment of the brake caliper, is not impaired. In the event of the resilient arrangement, which clamps the brake caliper relative to the brake support member, breaking, this securing element maintains the brake caliper in its position so that the operability of the brake continues to be ensured. The securing element is advantageously a securing bolt adapted to be fastened to the brake support member or the brake caliper and aligned parallel to the retaining pin and engaging with clearance into a recess provided in the other member, i.e. the brake caliper or the brake support member.

To obtain a symmetrical structure of the brake, it is advantageous to provide a second retaining pin to function as a securing bolt, which is arranged in a laterally reversed relationship to the first retaining pin with respect to the brake center. To avoid confusion, the second retaining pin has the same dimensions as the first retaining pin.

A very simple structure of the disc brake according to this invention is advantageously obtained by rigidly connecting the securing bolt with the brake caliper, the securing bolt forming a connecting element between the brake caliper and the two bearing surfaces on the brake support member. In such a design of the disc brake of this invention it is also suitable to position the resilient arrangement for clamping the brake support member relative to the brake caliper between the brake shoes and the brake caliper. The resilient arrangement may be a leaf spring which is secured in a recess in the brake caliper. Such a leaf spring can be manufactured easily and requires no additional means for its fastening.

In order to avoid disengagement of the retaining pin during brake-shoe replacement, which may result in its guide being damaged, another proposal of the invention provides for a non-detachable connection of the retaining pin with the brake caliper or the brake support member, while the securing bolt is detachably connected.

Rattleproof clamping of the brake shoes relative to the brake support member is obtained in an advantageous manner by the resilient arrangement forcing the brake caliper against the radially outwardly directed front faces of the brake shoes' backing plates. In this arrangement it will be suitable to provide a bearing plate between the brake caliper and the backing plates which is adapted to be secured in a recess in the brake caliper. In this manner, the necessity of machining an abutment surface for the backing plates on the inner side of the caliper is eliminated. Another simplification of the disc brake of this invention as well as greater ease of maintenance is achieved advantageously by the securing bolt forming a holding element for the resilient arrangement. Disengagement of the securing bolt also results in disengagement of the resilient arrangement, so that the brake caliper may be pivoted about the retaining pin and access is provided to the brake shoes disposed in an opening in the brake support member.

Brief Description of the Drawing

Above-mentioned and other features and objects of this invention will become more apparent by reference to the following description taken in conjunction with the accompanying drawing, in which.

Description of the Preferred Embodiments

Figure 1:
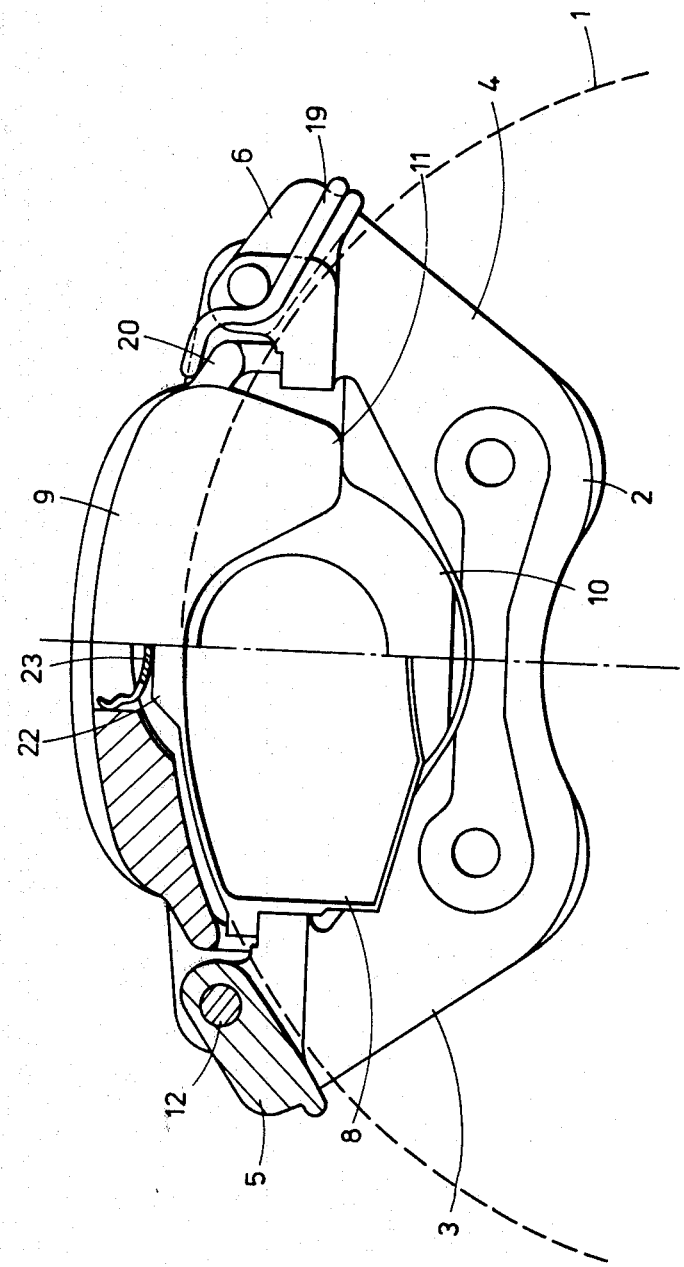
FIGS. 1 and 2 are a lateral view and a top plan view, respectively, partly in section, of an asymmetrical spot-type disc brake constructed in accordance with the principles of the present invention.

The embodiments illustrated in the drawings relate to floating-caliper spot-type disc brakes designed for use in passenger vehicles. Both embodiments are very similar with respect of their basic structure. Therefore, like parts have been assigned like reference numerals.

Figure 2:
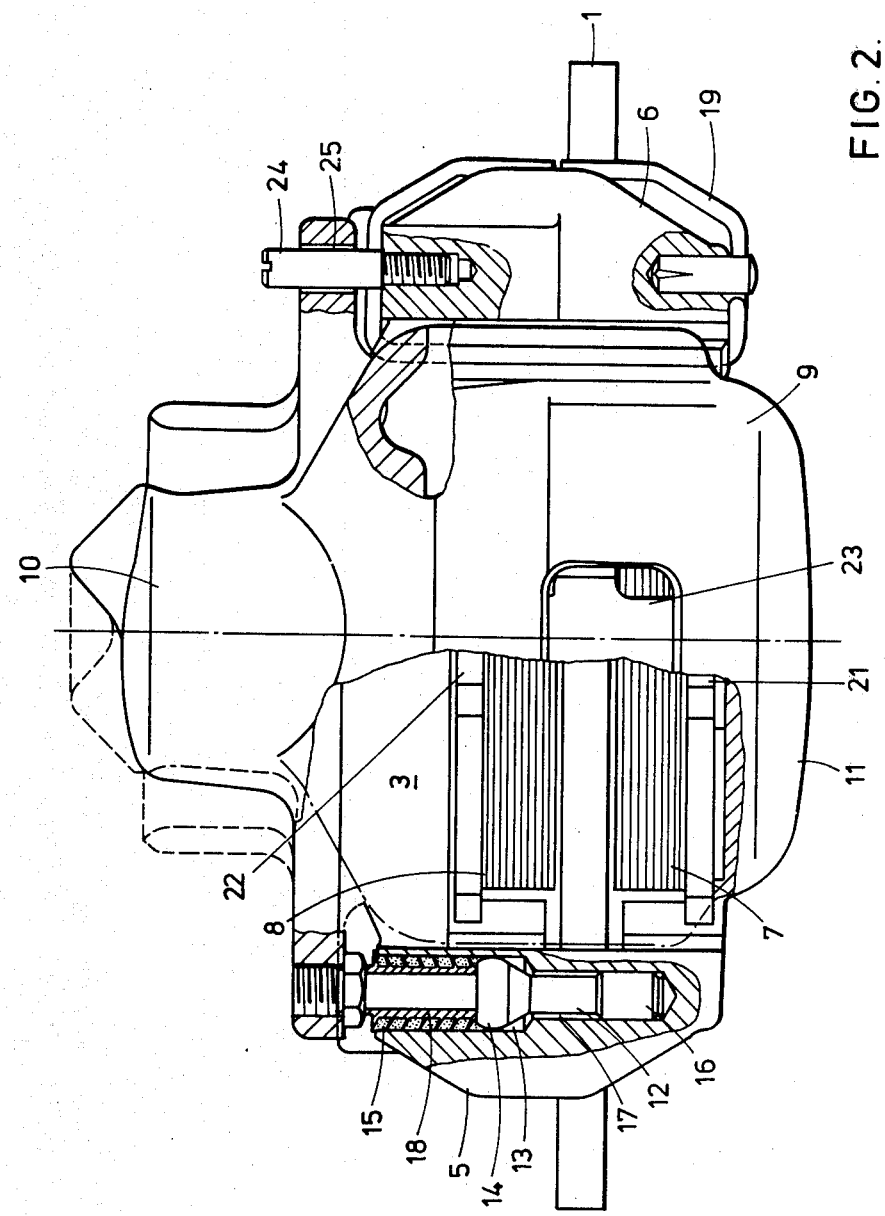

The spot-type disc brakes shown in Figs. 1 and 2 include a brake support member 2 adapted to be bolted to the steering knuckle or another component of the wheel suspension of a vehicle laterally adjacent a brake disc 1. Brake support member has two arms 3 and 4 extending substantially radially and in parallel with brake disc 1, with ends 5 and 6 of arms 3 and 4, respectively, projecting over the edge of brake disc 1. With its arms 3 and 4 and ends 5 and 6, brake support member 2 provides a boundary for an opening which is centrally disposed relative to brake support member 2 and accommodates, on each side of brake disc 1, brake shoes 7 and 8 each composed of a friction pad and a backing plate. With the front faces of their backing plates, brake shoes 7 and 8 are supported in a peripheral direction and radially inwardly upon guiding surfaces of ends 5 and 6 of brake support member 2.

The opening between ends 5 and 6 accommodates further a brake caliper 9 which embraces the edge of brake disc 1 and brake shoes 7 and 8 from the outside. On one side of brake disc 1, brake caliper 9 includes a hydraulically actuatable actuating cylinder 10 whose piston acts directly on the backing plate of brake shoe 8. On the opposite side of brake disc 1, a leg 11 of brake caliper 9 rests against the side of the backing plate of brake shoe 7 remote from brake disc 1.

In order to be able to force brake shoe 7 into engagement with brake disc 1 when actuating cylinder 10 is energized, brake caliper 9 is displaceably carried by brake support member 2 in the direction of the axis of rotation of the brake disc. For this purpose, brake caliper 9 is rigidly connected with a retaining pin 12 which is displaceably received in a stepped bore 13 in arm end 5. Retaining pin 12 is provided with a spherical sliding surface 14 sliding in the cylindrical larger-diameter section 15 of stepped bore 13 with minimum possible clearance. It has proved useful if the clearance between spherical sliding surface 14 and section 15 of stepped bore 13 corresponds to fit H 10/d 8 . A second sliding surface 16 of retaining pin 12 extends into the reduced-diameter section 17 of stepped bore 13. There is, however, a larger clearance between sliding surface 16 and section 17 which preferably amounts to 0.3 to 0.6 millimeters. Between spherical sliding surface 14 and the end of retaining pin 12 rigidly bolted to brake caliper 9, the retaining pin has a reduced-diameter portion providing a necking-down or reduced diameter portion in which a sealing element 18 designed as a laminated seal is disposed to close the open end of stepped bore 13.

The inner space of stepped bore 13 which is sealed by sealing element 18 is suitably filled with a lubricant, for example, grease, in order to reduce the sliding friction between retaining pin 12 and the bore wall of bore 13 and to counteract the occurrence of corrosion.

In the embodiment described, the retaining pin 12 provides with its spherical sliding surface 14 a smooth bearing for brake caliper 9 which is freely adjustable within the limits of the clearance between sliding surface 16 and bore section 17 and enables brake caliper 9 to adapt its position to the position of brake shoes 7 and 8, independent of manufacturing tolerances and deformations of brake support member 2. Therefore, brake shoes 7 and 8 are able to align themselves in their guiding surfaces parallel to the friction surface of brake disc 1, irrespective of the position of brake caliper 9, so that an even wear of the friction pads of brake shoes 7 and 8 occurs. This effect is ensured by dimensioning the clearance between sliding surface 16 and section 17 of stepped bore 13 such that the deformations occurring during operation and the manufacturing tolerances to be expected may be compensated for all operating states. The designer may also choose the clearance between sliding surface 16 and section 17 within sufficient limits, because sliding surface 16 is not required to perform a function during operation of the brake but is only needed to hold brake caliper 9 when the latter is pivoted out of its position shown in the drawing for replacement of brake shoes 7 and 8.

Since retaining pin 12 provides a bearing for brake caliper 9 in one point only, further means are required to guide brake caliper 9 on brake support member 2. In the two embodiments, these further means are of different design. In the embodiment shown in FIGS. 1 and 2, brake caliper 9 is forced radially inwardly against brake shoes 7 and 8 by a spring clip 19 which is secured to arm end 6 of brake member 2 and acts on a rib 20 of brake caliper 9. To provide suitable bearing surfaces, the backing plates of brake shoes 7 and 8 have radially outwardly extending projections 21 and 22 which with their radially outward front faces provide the bearing surfaces for brake caliper 9.

To simplify the manufacture, a bearing plate 23 is secured to the inner side of brake caliper 9 to support brake caliper 9 on the bearing surfaces of projections 21 and 22. Thus, in the embodiment of FIGS. 1 and 2, brake caliper 9 is supported on brake support member 2 through spherical sliding surface 14 of retaining pin 12 and projections 21 and 22 of brake shoes 7 and 8. This provides a three-point bearing ensuring a statically determined and stable support for brake caliper 9 in all operating states. Moreover, by brake caliper 9 being supported by brake shoes 7 and 8 themselves this favorably adds to the proper alignment of brake caliper 9 relative to brake shoes 7 and 8.

In order to keep brake caliper 9 in its illustrated position in the event of spring clip 19 breaking and to ensure continued operability of the brake, a securing bolt 24 is fastened to arm end 6 of brake support member 2 and engages with clearance into a bore 25 in brake caliper 9. The clearance between securing bolt 24 and bore 25 is likewise of a magnitude that will not impair the alignment of brake caliper 9. Securing bolt 24 is detachably bolted to arm end 6 and has to be unscrewed for replacement of brake shoes 7 and 8. Since securing bolt 24 also serves to hold spring clip 19, spring clip 19 may likewise be removed from arm end 6 following removal of bolt 24, so that brake caliper 9 may be pivoted radially outwardly about retaining pin 12, thus providing free access to brake shoes 7 and 8.

Figure 3:
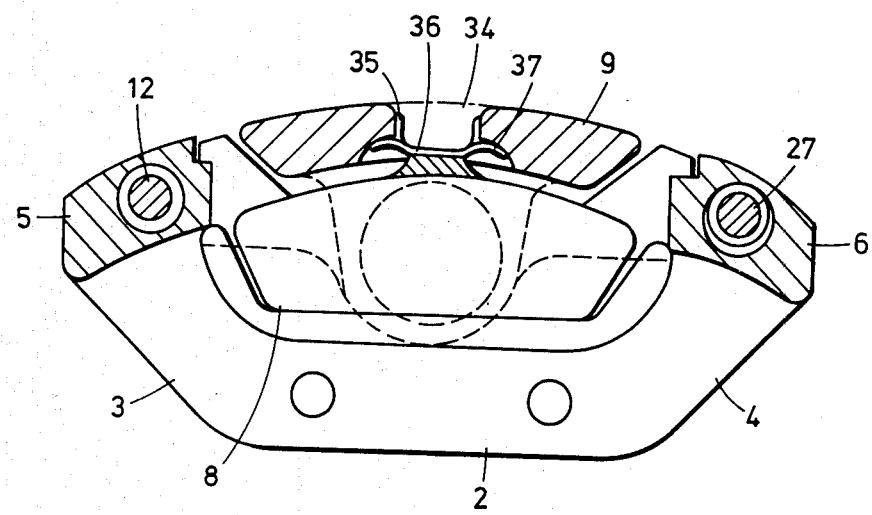
FIGS. 3 and 4 are a lateral view and a top plan view, respectively, partly in section, of a symmetrical spot-type disc brake constructed in accordance with the principles of the present invention.
Figure 4:
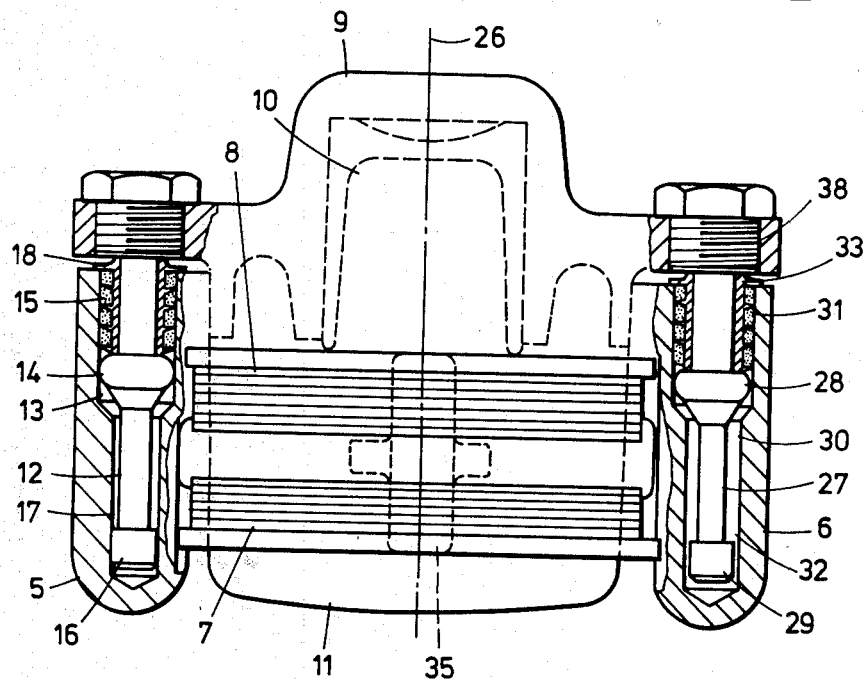

In the embodiment shown in FIGS. 3 and 4, a second retaining pin 27, which is symmetrical to the first retaining pin 12 with respect to the center line 26 of the brake, is provided and rigidly bolted to brake caliper 9 and has the same outer dimensions as retaining pin 12. Retaining pin 27 extends into a stepped bore 30 disposed in arm end 6 of brake support member 2 and includes a spherical sliding surface 28 cooperating with the bore section 31, and a second sliding surface 29 cooperating with the bore section 32. Between sliding surfaces 28 and 29 and bore sections 31 and 32, a clearance is provided which is of a magnitude not impairing the self-alignment of brake caliper 9 relative to brake shoes 7 and 8. This clearance preferably amounts to 0.3 to 0.6 millimeters. A sealing element 33, which corresponds to sealing element 18 as regards design and arrangement, closes the open end of stepped bore 30, thus preventing the ingress of dirt or humidity.

Similar to the embodiment of FIGS. 1 and 2 brake caliper 9 is likewise guided at three locations, i.e., the sliding surfaces 14, 28 and 29. To avoid rattling of brake caliper 9 at the guides formed by sliding surfaces 28 and 29, a leaf spring 35 is provided between the center portion of brake caliper 9 and the backing plates of brake shoes 7 and 8, which spring is fastened in a central opening 34 in brake caliper 9. Spring 35 supported from brake caliper 9 has essentially a cross shape and includes a leg 36, extending in the direction of center axis 26, bearing against the front edges of the backing plates of brake shoes 7 and 8 and a spring leg 37 extending perpendicular to leg 36 bearing on brake caliper 9.

Leaf spring 35 urges brake caliper 9 radially outwardly so that sliding surfaces 28 and 29 are in abutment with the radially outer area of stepped bore 30. With its counterforce leaf spring 35 urges brake shoes 7 and 8 radially inwardly against the guiding surfaces on arm ends 5 and 6 of brake support member 2.

In this embodiment, replacement of brake shoes 7 and 8 is performed by unscrewing retaining pin 27 from the threaded bore in brake caliper 9 and subsequent removal of retaining pin 27 out of stepped bore 30 of brake support member 2. Then brake caliper 9 may be pivoted about retaining pin 12 until brake shoes 7 and 8 can be removed from brake support member 2 radially outwardly. In order to avoid the mechanic inadvertently unscrews retaining pin 12 in such a symmetrical brake design, retaining pin 12 may be riveted or otherwise undetachably secured to brake caliper 9.

Removal of retaining pin 27 is particularly facilitated by arranging for the core diameter of its retaining thread 38 to be greater than the diameter of spherical sliding surface 28. This design is particularly advantageous if brake support member 2 is integrally formed with the steering knuckle or bearing bracket of the wheel suspension of a vehicle. In that case, brake caliper 9 may be placed radially on brake support member 2 already fitted to the vehicle together with brake shoes 7 and 8, and then be subsequently bolted to brake support members 2 by inserting retaining pins 12 and 27 from the side of actuating cylinder 10.

While I have described above the principles of my invention in connection with specific apparatus it is to be clearly understood that this description is made only by way of example and not as a limitation to the scope of my invention as set forth in the objects thereof and in the accompanying claims.

I claim:
1. A spot-type disc brake comprising:
 a brake support member straddling a brake disc having a central opening in which a pair of brake shoes are disposed, each of said pair of brake shoes being disposed on a different side of said disc and being guided on guide surfaces present in said support member;
 a brake caliper disposed in said central opening embracing said disc and said pair of brake shoes from the outside, said caliper carrying a brake-actuating device on one side of said disc in direct actuating relationship with one of said pair of brake shoes; and
 a sliding guide arrangement to connect said caliper to said support member including a first closed end bore in one of said caliper and said support member, a first retaining pin parallel to the axis of rotation of said disc fastened to the other of said caliper and said support member and slidably received in said first bore, said first retaining pin having a spherical sliding surface in engagement with an associated first portion of a cylindrical inner surface of said first bore to provide a first bearing surface to support said caliper at a first point, said first retaining pin enabling relative movement between said caliper and said support member in all operating states of said brake for continuous alignment of said caliper with said pair of brake shoes, a resilient arrangement to clamp said caliper to said support member, and two additional spaced bearing surfaces disposed on one of said support member and said pair of brake shoes to support said caliper at second and third points.

2. A brake according to claim 1, wherein said first retaining pin further includes a second sliding surface spaced from said spherical sliding surface, said second sliding surface having a clearance with respect to an associated second portion of said cylindrical inner surface of said first bore greater than that clearance between said spherical sliding surface and said associated first portion of said cylindrical inner surface of said first bore.

3. A brake according to claim 2, wherein said spherical sliding surface is disposed approximately in the middle of said first retaining pin and said second sliding surface is disposed at the end of said first retaining pin adjacent said closed end of said first bore.

4. A brake according to claim 3, wherein said second sliding surface has a smaller diameter than said spherical sliding surface.

5. A brake according to claim 4, wherein said first bore has a stepped cylindrical inner surface.

6. A brake according to claim 2, wherein the end of said first retaining pin extending out of said first bore and fastened to said other of said caliper and said support member carries an external thread whose core diameter is greater than the diameter of said spherical sliding surface.

7. A brake according to claim 6, wherein said first retaining pin further includes a reduced diameter portion between where it is fastened to said other of said caliper and said support member and said spherical sliding surface, said reduced diameter portion supporting a laminated seal in sealed abutment with said first portion of said cylindrical inner surface of said first bore.

8. A brake according to claim 2, wherein said first retaining pin further includes a reduced diameter portion between where it is fastened to said other of said caliper and said support member and said spherical sliding surface, said reduced diameter portion supporting a laminated seal in sealed abutment with said first portion of said cylindrical inner surface of said first bore.

9. A brake according to claim 1, wherein the end of said first retaining pin extending out of said first bore and fastened to said other of said caliper and said support member carries an external thread whose core diameter is greater than the diameter of said spherical sliding surface.

10. A brake according to claim 9, wherein said first retaining pin further includes a reduced diameter portion between where it is fastened to said other of said caliper and said support member and said spherical sliding surface, said reduced diameter portion supporting a laminated seal in sealed abutment with said first portion of said cylindrical inner surface of said first bore.

11. A brake according to claim 1, wherein said first retaining pin further includes a reduced diameter portion between where it is fastened to said other of said caliper and said support member and said spherical sliding surface, said reduced diameter portion supporting a laminated seal in sealed abutment with said first portion of said cylindrical inner surface of said first bore.

12. A brake according to claim 1, further including a securing element disposed parallel to and spaced from said first retaining pin to provide positive engagement between said caliper and said support member in a manner that will not impair relative movement between said caliper and said support member necessary for alignment of said caliper.

13. A brake according to claim 12, wherein said securing element includes a securing bolt fastened to said one of said caliper and said supporting member parallel to said first retaining pin and engaging with clearance an aperture in said other of said caliper and said supporting member.

14. A brake according to claim 13, wherein said first retaining pin is non-detachably fastened to said other of said caliper and said support member, and said securing bolt is detachably fastened to said one of said caliper and said support member.

15. A brake according to claim 14, wherein said securing bolt is a holding element for said resilient arrangement.

16. A brake according to claim 15, wherein each of said pair of brake shoes includes a projection directed toward said caliper to provide said two additional bearing surfaces, and said resilient arrangement forces said caliper against each of said projections.

17. A brake according to claim 16, wherein a bearing plate is disposed in a recess in said caliper between said caliper and each of said projections.

18. A brake according to claim 14, wherein each of said pair of brake shoes includes a projection directed toward said caliper to provide said two additional bearing surfaces.

19. A brake according to claim 18, wherein a bearing plate is disposed in a recess in said caliper between said caliper and each of said projections.

20. A brake according to claim 12, wherein said securing element includes a second retaining pin fastened to said other of said caliper and said support member parallel to said first retaining pin and engaging with clearance a second closed-end bore in said one of said caliper and said support member.

21. A brake according to claim 20, wherein said second retaining pin and said second bore have the same dimensions as said first retaining pin and said first bore.

22. A brake according to claim 20, wherein
said second bore is disposed in said support member,
said two additional bearing surfaces being disposed at spaced portions of a cylindrical inner surface of said second bore, and
said second retaining pin is rigidly connected to said caliper and provides a connecting element between said caliper and said two additional bearing surfaces in said second bore.

23. A brake according to claim 22, wherein
said resilient arrangement is disposed between said caliper and said pair of brake shoes.

24. A brake according to claim 23, wherein
said resilient means includes
a leaf spring secured to a recess in said caliper.

25. A brake according to claim 20, wherein
said first retaining pin is non-detachably fastened to said other of said caliper and said support member, and
said second retaining pin is detachably fastened to said other of said caliper and said support member.

26. A brake according to claim 1, wherein
each of said pair of brake shoes includes
a projection directed toward said caliper to provide said two additional bearing surfaces.

27. A brake according to claim 26, wherein
a bearing plate is disposed in a recess in said caliper between said caliper and each of said projections.

* * * * *